(12) United States Patent
Suciu et al.

(10) Patent No.: US 9,574,520 B2
(45) Date of Patent: Feb. 21, 2017

(54) REVERSE CORE ENGINE THRUST REVERSER FOR UNDER WING

(71) Applicant: United Technologies Corporation, Hartford, CT (US)

(72) Inventors: Gabriel L. Suciu, Glastonbury, CT (US); Jesse M. Chandler, South Windsor, CT (US); Brian D. Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 147 days.

(21) Appl. No.: 14/190,178

(22) Filed: Feb. 26, 2014

(65) Prior Publication Data

US 2014/0252167 A1    Sep. 11, 2014

Related U.S. Application Data

(60) Provisional application No. 61/773,903, filed on Mar. 7, 2013.

(51) Int. Cl.
| | |
|---|---|
| *F02K 1/54* | (2006.01) |
| *F02K 1/70* | (2006.01) |
| *B64D 33/04* | (2006.01) |
| *B64D 29/06* | (2006.01) |

(52) U.S. Cl.
CPC .............. *F02K 1/70* (2013.01); *B64D 29/06* (2013.01); *B64D 33/04* (2013.01); *F05D 2250/314* (2013.01); *Y02T 50/671* (2013.01)

(58) Field of Classification Search
CPC ............... F02K 1/54; F02K 3/04; F02K 3/06; F02K 3/062; B64D 29/02; B64F 29/06; B64F 33/04; G05F 2250/31; G05F 2250/311–2250/314
USPC ................................................ 244/110 B, 55
See application file for complete search history.

(56) References Cited

U.S. PATENT DOCUMENTS

| | | | |
|---|---|---|---|
| 4,193,262 A * | 3/1980 | Snell ............................. 60/761 |
| 5,943,856 A | 8/1999 | Lillibridge et al. |
| 6,260,801 B1 * | 7/2001 | Peters et al. ............ 244/110 B |
| 7,735,778 B2 * | 6/2010 | Lair et al. ................ 244/110 B |
| 8,051,639 B2 | 11/2011 | Lair |
| 8,104,261 B2 | 1/2012 | Marshall et al. |
| 8,109,466 B2 | 2/2012 | Aten et al. |
| 8,151,551 B2 | 4/2012 | Pero |
| 8,172,175 B2 | 5/2012 | Lair |
| 8,176,725 B2 | 5/2012 | Norris et al. |
| 8,276,362 B2 | 10/2012 | Suciu et al. |
| 8,720,182 B2 * | 5/2014 | Jain ......................... F02K 1/11 239/265.19 |

(Continued)

*Primary Examiner* — Richard G Davis
(74) *Attorney, Agent, or Firm* — Kinney & Lange, P.A.

(57) ABSTRACT

A gas turbine engine for mounting under a wing of an aircraft has a propulsor that rotates on a first axis, and an engine core including a compressor section, a combustor section, and a turbine section, with the turbine section being closer to the propulsor than the compressor section. The engine core is aerodynamically connected to the propulsor and has a second axis. A nacelle is positioned around the propulsor and engine core. The nacelle is attached to the wing of the aircraft. A downstream end of the nacelle has at least one pivoting door with an actuation mechanism to pivot the door between a stowed position and a horizontal deployed position in which the door inhibits a flow to provide a thrust reverse of the flow.

19 Claims, 4 Drawing Sheets

(56) References Cited

U.S. PATENT DOCUMENTS

| | | | |
|---|---|---|---|
| 8,789,354 B2 * | 7/2014 | Suciu et al. ................. | 60/226.1 |
| 2009/0126341 A1 | 5/2009 | Lair | |
| 2013/0025286 A1 | 1/2013 | Kupratis | |

* cited by examiner

REVERSE CORE ENGINE THRUST REVERSER FOR UNDER WING

CROSS-REFERENCE TO RELATED APPLICATION(S)

This application claims priority from U.S. Provisional Application No. 61/773,903, for "REVERSE CORE ENGINE THRUST REVERSER FOR UNDER WING" filed Mar. 7, 2013.

BACKGROUND

This application relates generally to a gas turbine engine for an aircraft, and more specifically, to the inclusion of a thrust reverser at a rear end of a gas turbine engine mounted under an aircraft wing.

Gas turbine engines typically include a fan delivering air into a compressor section and also outwardly of the compressor as bypass air. Air from the compressor section passes into a combustor, is mixed with fuel, and ignited. Products of this combustion pass downstream over turbine rotors, driving them to rotate.

In typical gas turbine engines, the fan is positioned axially at a forward end of an engine, and a compressor section is attached downstream thereto. A combustor section and turbine section are located downstream of the compressor section in axial alignment so that the compressor section is nearer the fan than the combustor section or turbine section. In a reverse flow gas turbine engine, the turbine section is adjacent the fan, and the combustor section is at an inner end of the turbine section, with the compressor positioned farthest from the fan.

A thrust reverser is utilized once an aircraft carrying the gas turbine engine has landed, and acts to create a reverse force to slow the aircraft.

One concept that has been proposed in gas turbine engines is a thrust reverser provided by pivoting shell halves at the rear of the turbine section. Such thrust reversers were generally utilized in prior gas turbine engines which used little, or no, bypass air. That is, the thrust reverser only blocked only the turbine flow. For bypass engines, a second thrust reverser is typically present in the nacelle to block the bypass flow adjacent the fan exit.

In addition, various types of thrust reversers have been incorporated into more modern gas turbine engines which do have a large fan providing bypass air as propulsion, and in addition to the air passing through the compressor. However, this standard type of gas turbine engine generally had an engine core that extended beyond the end of the nozzle, such that the shell halves could not pivot inwardly to a thrust reverse position.

SUMMARY

In one embodiment, a gas turbine engine for mounting under a wing of an aircraft has a propulsor that rotates on a first axis, and an engine core including a compressor section, a combustor section, and a turbine section, with the turbine section being closer to the propulsor than the compressor section. The engine core is aerodynamically connected to the propulsor and has a second axis. A nacelle is positioned around the propulsor and engine core. The nacelle is attached to the wing of the aircraft. A downstream end of the nacelle has at least one pivoting door with an actuation mechanism to pivot the door between a stowed position and a horizontal deployed position in which the door inhibits a flow to provide a thrust reverse of the flow.

In another embodiment, an aircraft has a main body fuselage, a wing extending from the fuselage, and a gas turbine engine attached to the wing. The gas turbine engine has a propulsor that rotates on a first axis, and an engine core including a compressor section, a combustor section, and a turbine section, with the turbine section being closer to the propulsor than the compressor section. The engine core is aerodynamically connected to the propulsor and has a second axis. A nacelle is positioned around the propulsor and engine core. The nacelle is attached to the wing of the aircraft. A downstream end of the nacelle has at least one pivoting door with an actuation mechanism to pivot the door between a stowed position and a horizontal deployed position in which the door inhibits a flow to provide a thrust reverse of the flow.

In yet another embodiment, a gas turbine engine for mounting under a wing of an aircraft includes a propulsor and an engine core mounted at an angle to the propulsor. The engine core includes a compressor section, a combustor section, and a turbine section, with the turbine section being closer to the propulsor than the compressor section. The engine core is aerodynamically connected to the propulsor. A nacelle positioned around the propulsor and engine core, and is attached to the wing of the aircraft. A downstream end of the nacelle has at least one pivoting door with an actuation mechanism to pivot the door between a stowed position and a horizontal deployed position in which the door inhibits a flow to provide a thrust reverse of the flow. When the door is in the deployed position, the door does not contact the engine core or block airflow into the compressor section of the engine core.

DETAILED DESCRIPTION

Traditional engines have an axial flow orientation with the turbine exit (core exit) facing aft due to the in-line axial arrangement. Typically such an arrangement has two thrust reversers: a first reverser for the bypass fan (propulsor), and a second reverser for the engine core (gas generator). A reverse core engine may have an angled core that allows for a single thrust reverser without issues associated with the long axial in-line designs of prior engines. When the engine is mounted below the wing of aircraft, the thrust reversers are in a horizontal arrangement when deployed.

Figure 1:
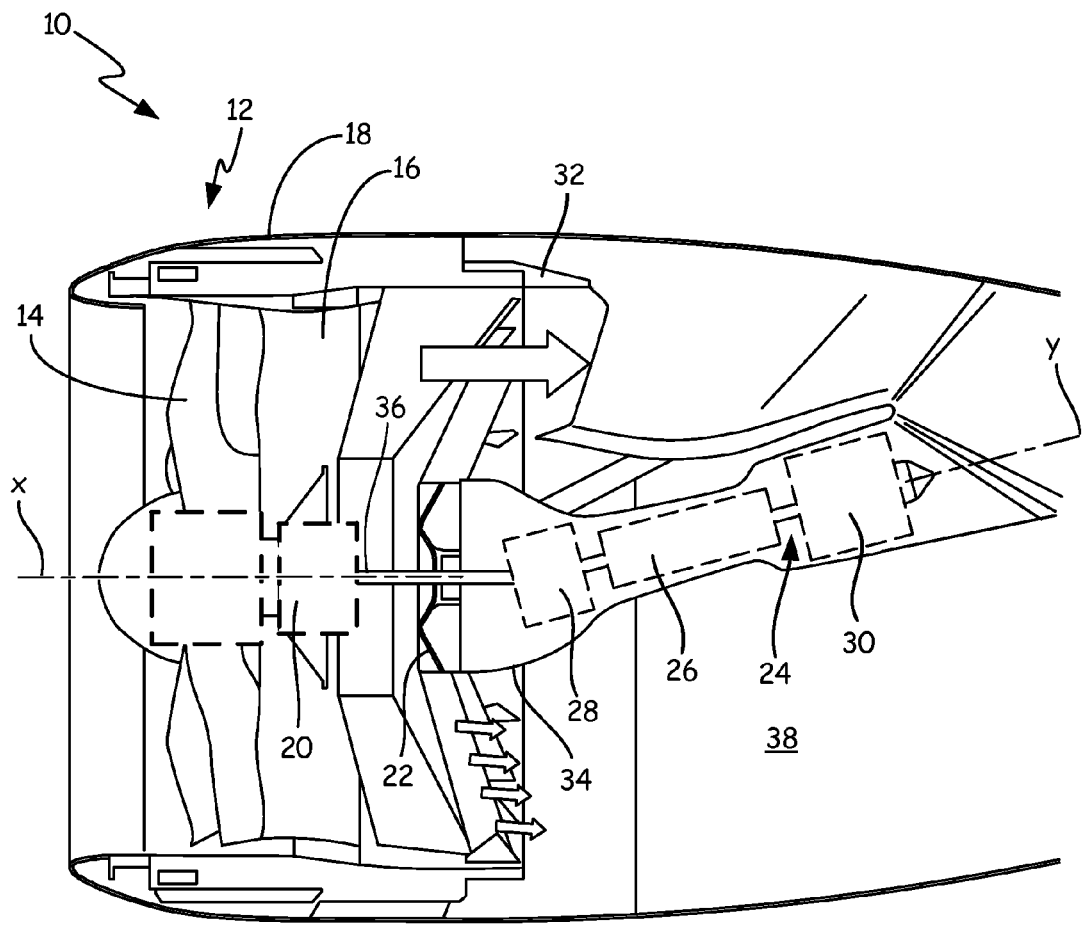
FIG. 1 is a schematic of a reverse core engine.

FIG. 1 is a schematic view of a reverse core engine. Engine 10 includes a propulsor 12 at a forward end which is centered for rotation about an axis X. Propulsor 12 includes a fan 14 and a nozzle 16 rearward thereof surrounded by a nacelle 18. Axis X is also a central axis of the fan and the nozzle. Engine 10 may include a gear reduction 20 driven by a power turbine section 22 to drive the fan 14.

A core engine 24 includes combustion section 26 positioned between a turbine section 28 and a compressor section 30. The core engine 24 may also be referred to as the gas generator of the turbine engine. Air from nacelle 18 passes into an inlet duct 32 to be delivered to the compressor 30. The duct 32 is over a limited circumferential extent within nacelle 18. At other circumferential locations within nacelle 18, air flows as bypass air for propulsion. The air is compressed and delivered into combustion section 26, where it mixes with fuel and is ignited. Products of this combustion pass through turbine section 28, which drives compressor section 30. The products of combustion then pass through a transition duct 34 over power turbine section 22, to drive the fan 14 that is connected by thereto by a propulsor shaft 36. Air then exits the power turbine 22 and is exhausted therefrom, such as by having a turbine nozzle that directs the flow aftward upon leaving the power turbine 22. The exhaust from the core engine 24 may be mixed with the bypass flow from the propulsor 12, creating a single exhaust airflow from engine 10.

The illustrated gas turbine engine is a "reverse flow engine" in that the compressor 30 is positioned further into (forward to aft) the engine than is the turbine 28. That is, the turbine section 28 is closest to the propulsor 12, the combustor section 26 and the compressor section 30 are positioned further away in the downstream or aft direction of the propulsor 12 relative to the turbine section 28.

The engine 10 is positioned such that the fan 12, the gear 20, and the power turbine 22 are positioned centered on the axis X, while the core engine 24, including the compressor section 26, the combustor section 24, and the turbine section 28, is positioned on a non-parallel axis Y. The core engine 24 may be mounted in some manner to the nozzle 16, such as through transition duct 34.

In an engine that is reverse flow, and in particular in one wherein the axes X and Y are not parallel, a relatively long core engine 24 can be achieved without the core engine blocking the exit area 38. However, the overall length of the engine 10 is reduced as the core engine 24 is mounted at an angle with respect to the propulsor 12.

Figure 2:
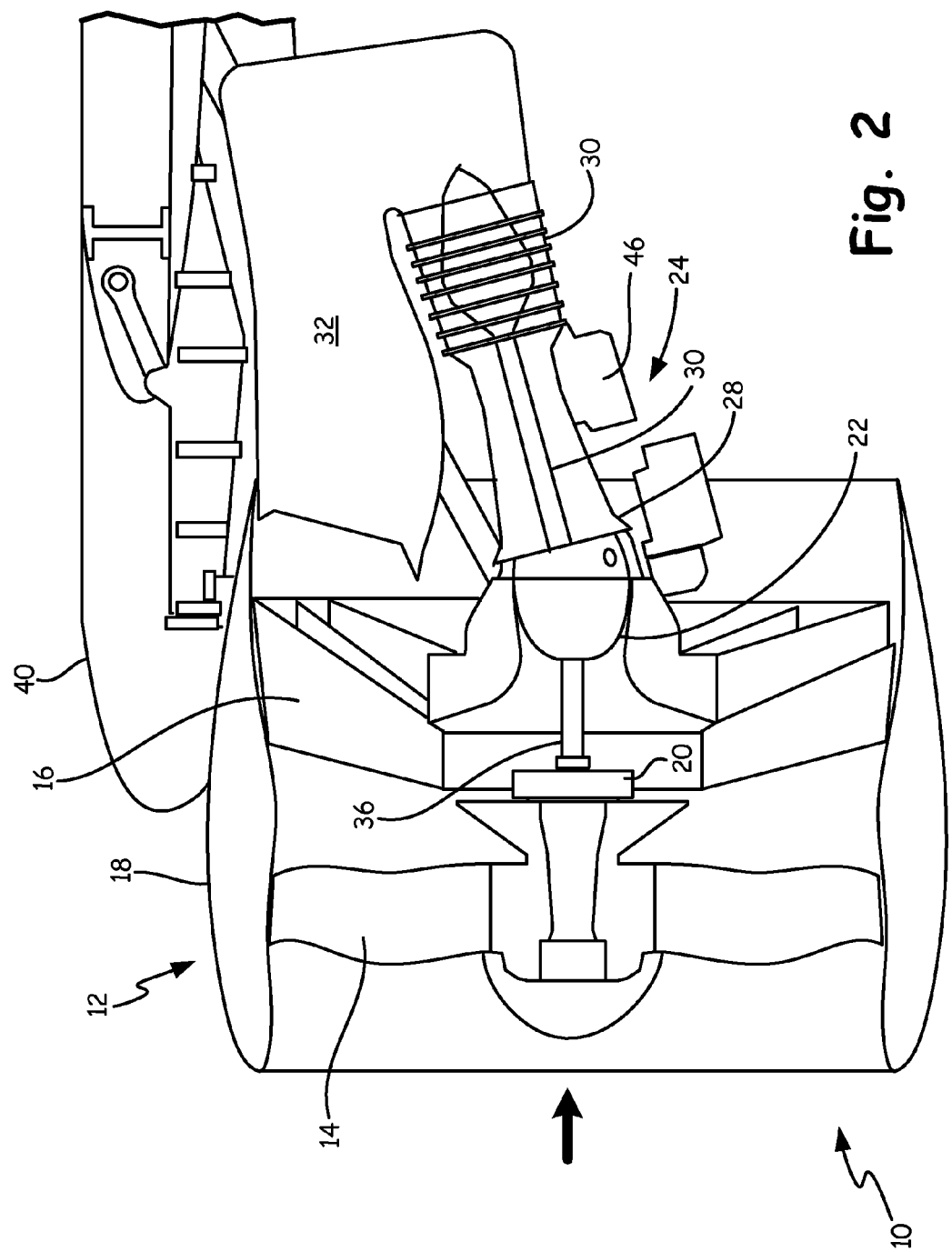
FIG. 2 is a cross-sectional view of a reverse core engine mounted under a wing.

FIG. 2 is a cross sectional view of the engine 10 mounted to an aircraft wing 40. Many of the same elements as shown in FIG. 1 are also illustrated in FIG. 2: engine 10 with the propulsor 12 having the fan 14 and the nozzle 16 surrounded by the nacelle 18, and the core engine 24 with the combustor section 26, the turbine section 28, and the compressor section 30 aligned along core engine shaft 42. The inlet duct 32 extends from the propulsor 12 to the compressor section 30 of the core engine 24. The transition duct 34 aerodynamically connects the turbine section 28 of the core engine 24 with the power turbine 22.

During normal operation, gases and airflow leaving the turbine section 28 will flow through the transition duct 34 into the power turbine 22, which will turn the propulsor shaft 36. The gears 20 will slow the speed of the propulsor shaft 36 as delivered to the fan 14 so that the fan 14 will run at a different speed than that of the power turbine 22. Typically, the gears are sized to slow the speed of the fan 14.

Figure 3:
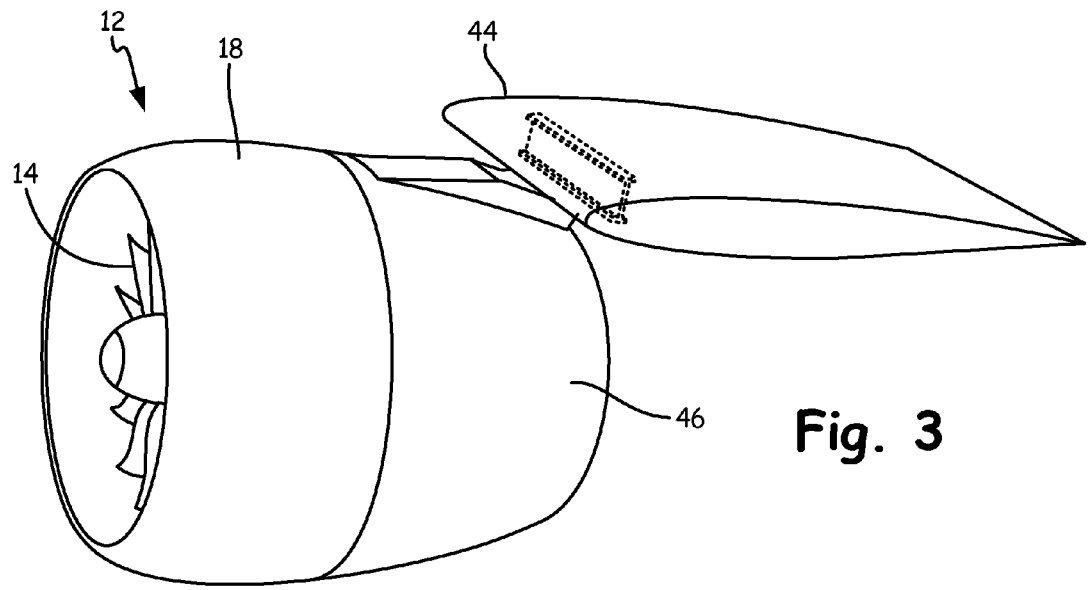
FIG. 3 is a perspective view of the reverse core engine mounted under a wing.

FIG. 3 is a perspective view of the reverse core engine 10 mounted under a wing 44 of an aircraft. A portion of the nacelle 18 covers the propulsor 12, including fan 14. A thrust reverser 46 is mounted aft of the portion of the nacelle 18 covering the propulsor.

Figure 4:
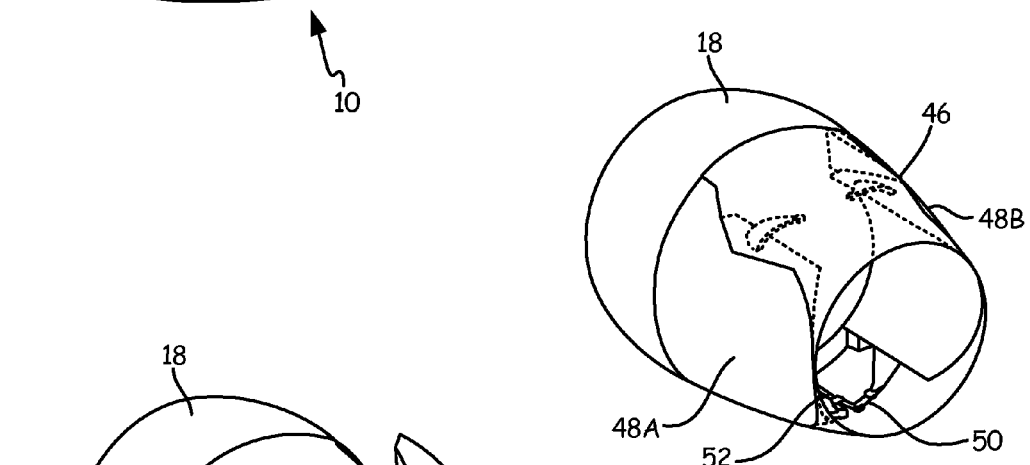
FIG. 4 is a perspective view of the reverse core engine with a thrust reverser in a stowed position.
Figure 5:
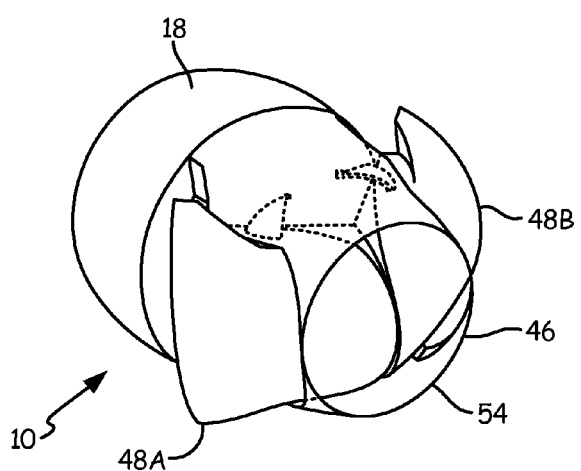
FIG. 5 is a perspective view of the reverse core engine with a thrust reverser in a deployed position.
Figure 6:
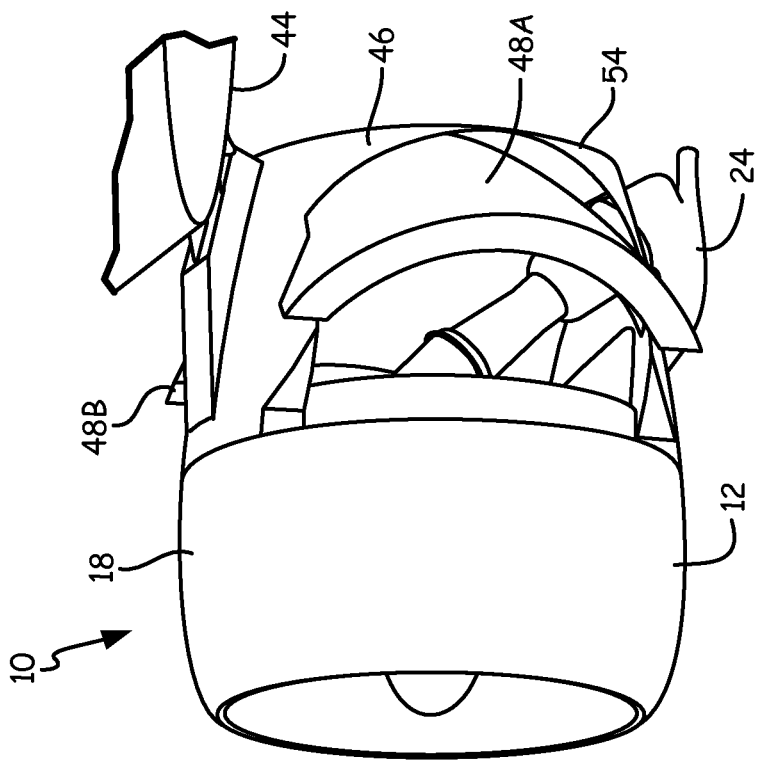
FIG. 6 is a perspective view of an alternate embodiment of the reverse core engine with a thrust reverser in a stowed position.
Figure 7:
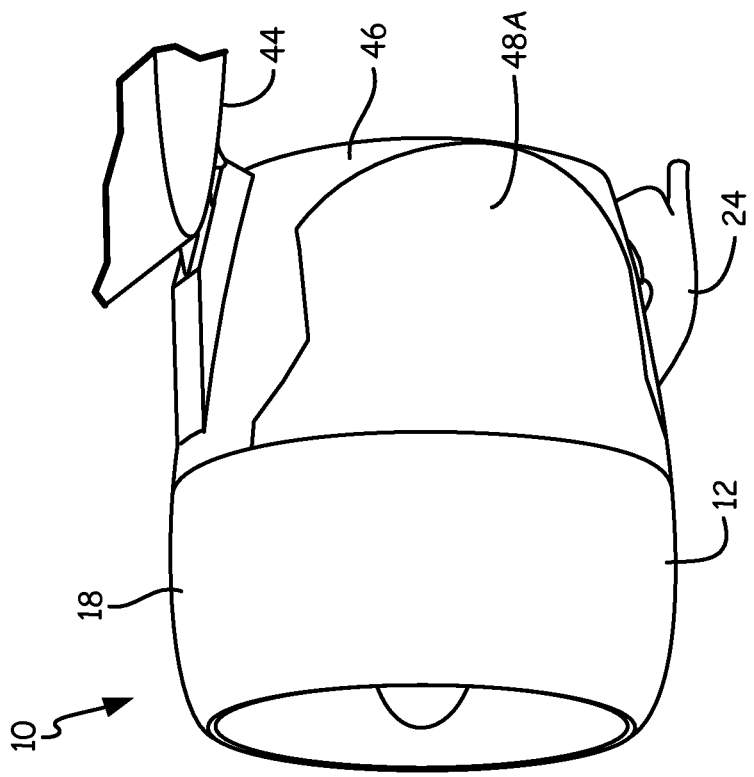
FIG. 7 is a perspective view of an alternate embodiment of the reverse core engine with a thrust reverser in a deployed position.

FIG. 4 is a perspective view of the reverse core engine 10 with the thrust reverser 46 in a stowed position, and FIG. 5 is a perspective view of the reverse core engine 10 with the thrust reverser 46 in a deployed position. Similarly, FIG. 6 is a perspective view of the reverse core engine 10 with the thrust reverser 46 in a stowed position, and FIG. 7 is a perspective view of the reverse core engine 10 with the thrust reverser 46 in a deployed position. The thrust reverser 46 is comprised of two pivoting doors 48A and 48B connected to a linkage system 50 driven by an actuation mechanism 52 (see FIG. 4). The doors 48A and 48B are held by a frame 54 that is attached as part of the nacelle 18, or that acts as a separate cowling for the core engine 24. The doors 48A and 48B pivot about points that permit the aft edges thereof to contact when deployed, which may be referred to as a clam shell arrangement. The actuation mechanism 52 is fixed within the nacelle 18, and may be a hydraulic actuator, electric screw actuator, or any similar structure known to those in the art. The linkage system may be a series of pivoting rods or bars, or similar structures also known to those in the art. Although illustrated with two pivoting doors in a clam shell configuration, it is envisioned that three or more doors may be used so long as the doors do not interfere with the core engine 24.

The position illustrated in FIG. 4 is the normal flight position. Once an aircraft associated with the engine 10 has landed, the actuation mechanism 52 drives the linkage system 50 into a deployed position of FIG. 5, in which the doors 48A and 48B are pivoted to a deployed position to block the exit area of the engine 10. The propulsor 12 and turbine section 28 continue to deliver exhaust gas against the deployed doors 48A and 48B, and create a reverse thrust tending to slow the aircraft.

In the disclosed arrangement of the engine 10 mounted under the wing 44 of the aircraft, the core engine 24 is angled to be perpendicular with the ground, with the compressor section entrance adjacent either at the top dead center or bottom dead center (see FIG. 7) of the engine 10. With this configuration, the pivoting doors 48A and 48B are centrally located on the sides of the engine 10. When deployed, the thrust reverser 46 will move the pivoting doors 48A and 48B in a general horizontal direction.

Once in the deployed position, the doors 48A and 48B will block both the bypass flow from the propulsor 12 and the exit flow from the turbine 28. The angle of the core engine 24 allows for the full closure or pivoting of the doors 48A and 48B behind the core engine 24 while not interfering or disrupting inlet flow thereof, or contacting the core engine 24 in the deployed position. The angled core engine 24 shortens the overall length of the engine 10. The system provides enhanced thrust reverse for the engine 10 as only one structure is needed to block both bypass flow and core engine exhaust flow due to the shortened length of the engine, along with the mixing of the bypass flow with the core engine exhaust flow adjacent the exit of the turbine section 28 of the core engine 24. Further, fewer parts are required for the engine as the doors of the thrust reverser are incorporated into the nacelle or cowl and serve a dual function. As a result, the weight of the engine is greatly reduced, and thus the thrust reverser 46 arrangement proportionally reduces the amount of fuel burned during flight.

DISCUSSION OF POSSIBLE EMBODIMENTS

The following are non-exclusive descriptions of possible embodiments of the present invention.

In one embodiment, a gas turbine engine for mounting under a wing of an aircraft has a propulsor that rotates on a first axis, and an engine core including a compressor section, a combustor section, and a turbine section, with the turbine section being closer to the propulsor than the compressor section. The engine core is aerodynamically connected to the propulsor and has a second axis. A nacelle is positioned around the propulsor and engine core. The nacelle is attached to the wing of the aircraft. A downstream end of the nacelle has at least one pivoting door with an actuation mechanism to pivot the door between a stowed position and a horizontal deployed position in which the door inhibits a flow to provide a thrust reverse of the flow.

The gas turbine engine of the preceding paragraph can optionally include, additionally and/or alternatively, any one or more of the following features, configurations and/or additional components:

wherein the first axis and second axis are non-parallel;

wherein the propulsor delivers air into the compressor section, and also delivers bypass air of the engine;

wherein the downstream end of the nacelle has a plurality of pivoting doors;

wherein each of the plurality of pivoting doors are driven by the actuation mechanism to move between the stowed position and the deployed position to provide thrust reverse of the flow;

wherein the plurality of doors are positioned in a clamshell arrangement; and/or wherein the flow includes a bypass flow from the propulsor and an exit flow from the engine core.

In another embodiment, an aircraft has a main body fuselage, a wing extending from the fuselage, and a gas turbine engine attached to the wing. The gas turbine engine has a propulsor that rotates on a first axis, and an engine core including a compressor section, a combustor section, and a turbine section, with the turbine section being closer to the propulsor than the compressor section. The engine core is aerodynamically connected to the propulsor and has a second axis. A nacelle is positioned around the propulsor and engine core. The nacelle is attached to the wing of the aircraft. A downstream end of the nacelle has at least one pivoting door with an actuation mechanism to pivot the door between a stowed position and a horizontal deployed position in which the door inhibits a flow to provide a thrust reverse of the flow.

The aircraft of the preceding paragraph can optionally include, additionally and/or alternatively, any one or more of the following features, configurations and/or additional components:

wherein the first axis and second axis are non-parallel;

wherein the propulsor delivers air into the compressor section, and also delivers bypass air of the engine;

wherein the downstream end of the nacelle has a plurality of pivoting doors;

wherein each of the plurality of pivoting doors are driven by the actuation mechanism to move between the stowed position and the horizontal deployed position to provide thrust reverse of the flow;

wherein the plurality of pivoting doors are positioned in a clamshell arrangement;

wherein the flow includes a bypass flow from the propulsor and an exit flow from the engine core;

wherein the engine is mounted under the wing;

a power turbine positioned downstream of the turbine section of the engine core; and a gear reduction between the power turbine and a fan of the propulsor to cause the fan to rotate at a slower speed than the power turbine;

wherein the engine core turbine section and said power turbine are separate turbines; and/or wherein the power turbine rotates on the first axis.

In yet another embodiment, a gas turbine engine for mounting under a wing of an aircraft includes a propulsor and an engine core mounted at an angle to the propulsor. The engine core includes a compressor section, a combustor section, and a turbine section, with the turbine section being closer to the propulsor than the compressor section. The engine core is aerodynamically connected to the propulsor. A nacelle positioned around the propulsor and engine core, and is attached to the wing of the aircraft. A downstream end of the nacelle has at least one pivoting door with an actuation mechanism to pivot the door between a stowed position and a horizontal deployed position in which the door inhibits a flow to provide a thrust reverse of the flow. When the door is in the deployed position, the door does not contact the engine core or block airflow into the compressor section of the engine core.

Although the present invention has been described with reference to preferred embodiments, workers skilled in the art will recognize that changes may be made in form and detail without departing from the spirit and scope of the invention.

The invention claimed is:

1. A gas turbine engine for mounting under a wing of an aircraft comprising:
a propulsor disposed at a forward end of the gas turbine engine and that rotates on a first axis; and
an engine core including a compressor section, a combustor section, and a turbine section, with the turbine section being closer to the propulsor than the compressor section, the engine core being aerodynamically connected to the propulsor and having a second axis, wherein the compressor section comprises an entrance positioned bottom center relative the first axis;
a nacelle positioned around the propulsor and engine core, the nacelle attached to the wing of the aircraft, wherein a downstream end of the nacelle has at least one pivoting door with an actuation mechanism to pivot the at least one door between a stowed position and a horizontal deployed position in which the at least one door inhibits a flow to provide a thrust reverse of the flow.

2. The gas turbine engine of claim 1, wherein the first axis and second axis are non-parallel.

3. The gas turbine engine of claim 1, wherein the propulsor delivers air into the compressor section, and also delivers bypass air of the engine.

4. The gas turbine engine of claim 1, wherein the downstream end of the nacelle has a plurality of pivoting doors.

5. The gas turbine engine of claim 4, wherein each of the plurality of pivoting doors are driven by the actuation mechanism to move between the stowed position and the horizontal deployed position to provide thrust reverse of the flow.

6. The gas turbine engine of claim 5, wherein the plurality of doors are positioned in a clamshell arrangement.

7. The gas turbine engine of claim 1, wherein the flow includes a bypass flow from the propulsor and an exit flow from the engine core.

8. An aircraft comprising:
a main body fuselage;
a wing extending from the main body fuselage; and
a gas turbine engine attached to the wing, the gas turbine engine including:

a propulsor disposed at a forward end of the gas turbine engine and that rotates on a first axis;

an engine core including a compressor section, a combustor section, and a turbine section, with the turbine section being closer to the propulsor than the compressor section, the engine core being aerodynamically connected to the propulsor and having a second axis, wherein the compressor section comprises an entrance positioned bottom center relative the first axis; and a nacelle positioned around the propulsor and engine core, wherein a downstream end of the nacelle has at least one pivoting door with an actuation mechanism to pivot the at least one door between a stowed position and a horizontal deployed position in which the at least one door inhibits a flow to provide a thrust reverse of the flow.

9. The aircraft of claim 8, wherein the first axis and second axis are non-parallel.

10. The aircraft of claim 8, wherein the propulsor delivers air into the compressor section, and also delivers bypass air of the engine.

11. The aircraft of claim 8, wherein the downstream end of the nacelle has a plurality of pivoting doors.

12. The aircraft of claim 11, wherein each of the plurality of pivoting doors are driven by the actuation mechanism to move between the stowed position and the horizontal deployed position to provide thrust reverse of the flow.

13. The aircraft of claim 12, wherein the plurality of pivoting doors are positioned in a clamshell arrangement.

14. The aircraft of claim 8, wherein the flow includes a bypass flow from the propulsor and an exit flow from the engine core.

15. The aircraft of claim 8 wherein the engine is mounted under the wing.

16. The aircraft as set forth in claim 8, further comprising:
a power turbine positioned downstream of the turbine section of the engine core; and
a gear reduction between the power turbine and a fan of the propulsor to cause the fan to rotate at a slower speed than the power turbine.

17. The aircraft as set forth in claim 16, wherein the engine core turbine section and said power turbine are separate turbines.

18. The aircraft as set forth in claim 17, wherein the power turbine rotates on the first axis.

19. A gas turbine engine for mounting under a wing of an aircraft comprising:

a propulsor disposed at a forward end of the gas turbine engine;

an engine core mounted at an angle to the propulsor, the engine core including a compressor section, a combustor section, and a turbine section, with the turbine section being closer to the propulsor than the compressor section, the engine core being aerodynamically connected to the propulsor, wherein the compressor section comprises an entrance positioned bottom center relative an axis of the propulsor; and a nacelle positioned around the propulsor and engine core, the nacelle attached to the wing of the aircraft;

wherein a downstream end of the nacelle has at least one pivoting door with an actuation mechanism to pivot the at least one door between a stowed position and a horizontal deployed position in which the at least one door inhibits a flow to provide a thrust reverse of the flow; and wherein when the door is in the deployed position, the door does not contact the engine core or block airflow into the compressor section of the engine core.

* * * * *